United States Patent [19]

Dybel

[11] 3,884,068
[45] May 20, 1975

[54] LOAD SENSING DEVICE
[75] Inventor: Frank R. Dybel, Olympia Fields, Ill.
[73] Assignee: International Measurement & Control Co., Park Forest South, Ill.
[22] Filed: Mar. 12, 1974
[21] Appl. No.: 450,443

[52] U.S. Cl. .......................... 73/88.5 R; 73/DIG. 4
[51] Int. Cl. ............................................. G01b 7/16
[58] Field of Search .................... 73/DIG. 4, 88.5 R

[56] References Cited
UNITED STATES PATENTS
3,108,470  10/1963  Martin .............................. 73/88.5 R
3,612,966  10/1971  Dybel ............................... 73/88.5 X
3,680,365  8/1972   Summers ........................... 73/88.5 R Primary Examiner—Charles A. Ruehl
Attorney, Agent, or Firm—Wolfe, Hubbard, Leydig, Voit & Osann, Ltd.

[57] ABSTRACT

An improved load sensing system adapted to monitor both compressive and tension loads that are incurred in press members during a working cycle. The system includes a piezoelectric transducer that produces an electrical signal proportional to changes in stress in the force carrying member and an electrical load limiting and detection circuit responsive to such signals to detect or monitor the loads in said member. A switch coupling provided between the circuit and the terminals of the transducer is operable to selectively reverse the connection between the transducer terminals and the circuit input leads so that in one setting the circuit indicates and monitors increases in compressive stresses in the press member and in its reverse setting monitors decreases in compressive stresses and increases in tension stresses in the member.

9 Claims, 3 Drawing Figures

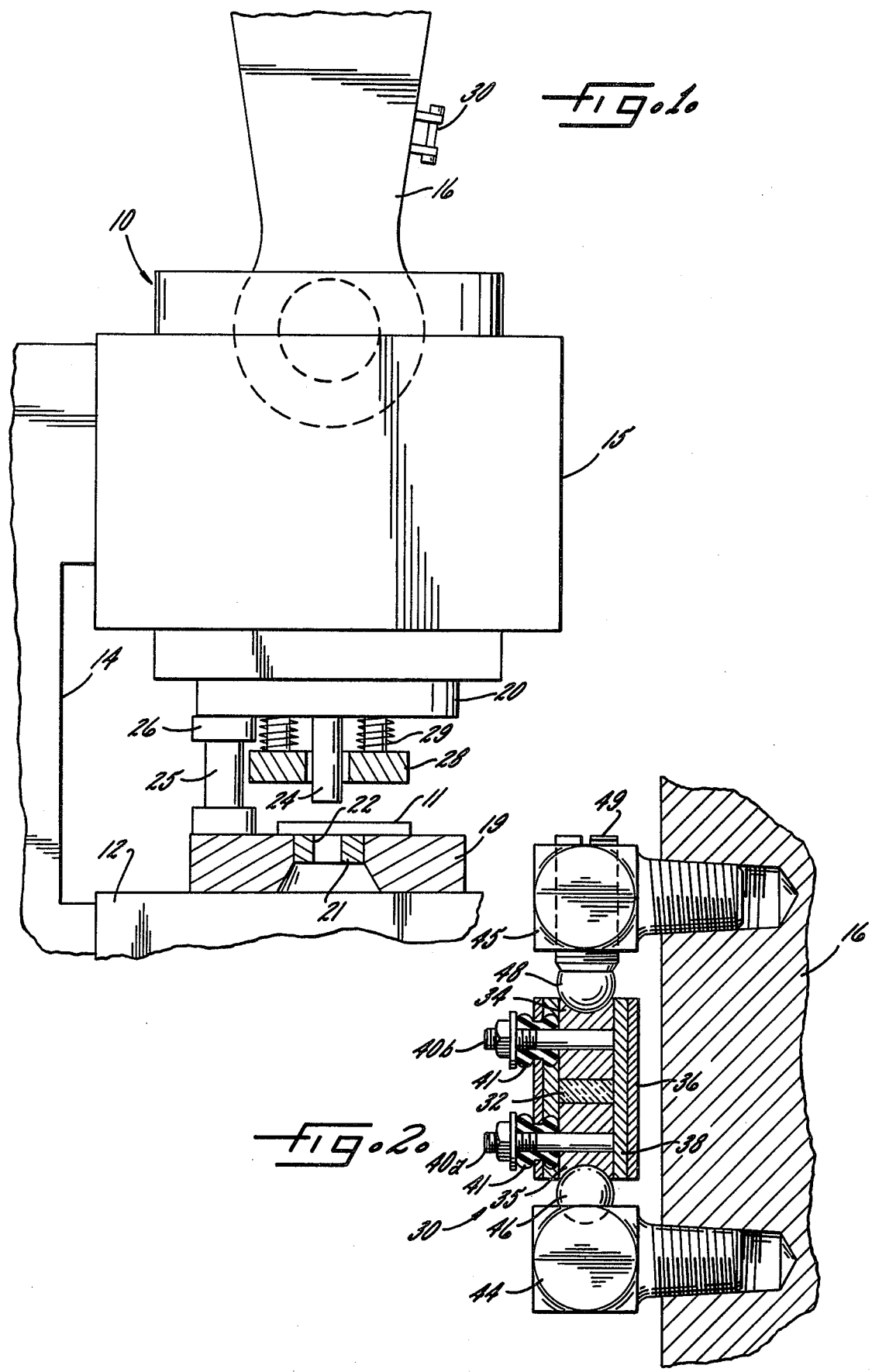

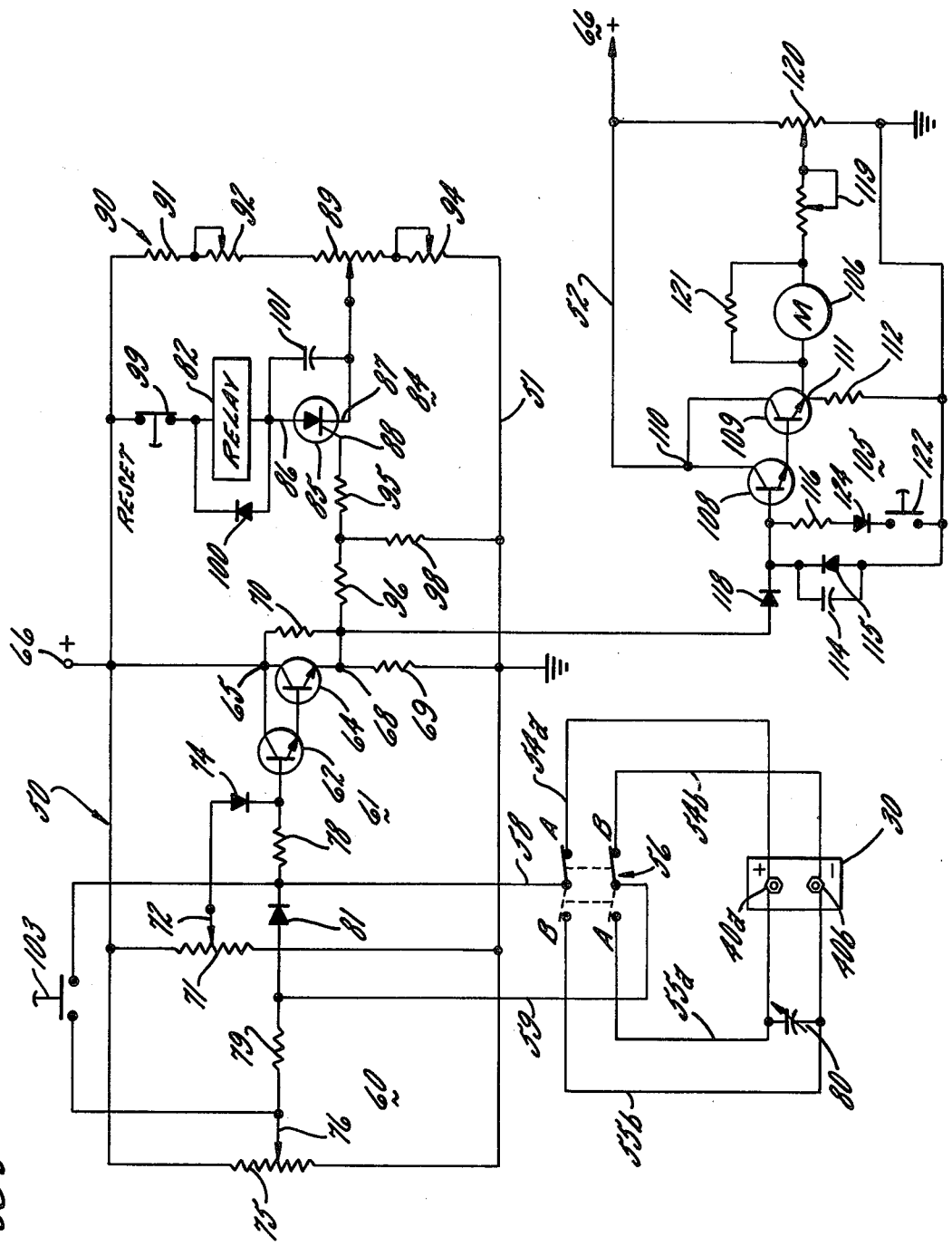

LOAD SENSING DEVICE

DESCRIPTION OF THE INVENTION

The present invention relates generally to load sensing devices, and more particularly to circuitry for use with piezoelectric crystal transducers that sense loads on force carrying members, such as press pitmans.

In large production presses, it is often essential to measure or monitor loads that are exerted on the press members to prevent damage thereto, and thus minimize costly shutdown time. In a typical punch press, when the punch strikes a workpiece extremely large compressive forces develop in the press pitman until the workpiece shears. At that point, the sudden release of resistance causes a phenomenon frequently referred to as "snapback" or "breakthrough", which results in a reverse or tension loading of the press members. In addition, when the press punch is being withdrawn from the workpiece after shearing, the workpiece often will bind or stick to the punch causing significant tension forces to again be exerted on the press member in effecting withdrawal of the punch. Such reverse or shock loadings, while being of a smaller magnitude than the compressive loads, can also cause serious damage to the press if design limits are exceeded. Thus during the press operation it is desirable to know both direct and reverse loadings on the press.

While load sensing devices presently are available for measuring the loads incurred in such press members, many present load sensing devices are adapted to measure only the compressive or the tension force, both not both. In the usual case, such load sensing equipment is designed to measure the compressive load of the press pitman, which is the largest and often the standard by which the load capabilities of the press are established and referenced. Heretofore, if it is desired to also determine the tension or reverse loads and to monitor and limit such loads, it has been necessary to utilize relatively expensive equipment.

It is an object of the present invention to provide an improved relatively simple load sensing device for press members that is adapted to indicate both direct and reverse loads.

Another object is to provide a load sensing device as characterized above that is adapted to indicate, measure, or monitor compressive loads in a press member and to also selectively indicate and limit reverse or tension loads that the member may incur.

A further object is to provide a load sensing device of the above kind that may be constructed at a reasonable cost with readily available circuit elements.

Other objects and advantages of the invention will become apparent upon reading the following detailed description and upon reference to the drawings in which:

FIG. 1 is a diagrammatic plane view, partially in section, of an illustrative punch press equipped with a load sensing system of the present invention;

FIG. 2 is a fragmentary section of a force carrying member of the press shown in FIG. 1 and a piezoelectric stress sensing transducer mounted thereon; and FIG. 3 is a diagram of a transducer sensing circuit constructed in accordance with the present invention.

While the invention is susceptible of various modifications and alternative constructions, a certain illustrative embodiment has been shown in the drawings and will be described below in detail. It should be understood, however, that there is no intention to limit the invention to the specific form disclosed, but, on the contrary, the intention is to cover all modifications, alternative constructions, and equivalents falling within the spirit and scope of the invention.

Referring more specifically to FIG. 1, there is shown a punch press 10 adapted to punch or stamp a suitable workpiece 11. The press 10 includes a bed 12 having an upstanding frame 14 that supports a slide 15 for relative vertical movement. For moving the slide 15, a connecting pitman or arm 16 is pivotably connected at one end to an upper portion of the slide 15 and is driven at its opposite upper end by an eccentric (not shown) of a conventional type.

Mounted between the press bed 12 and the slide 15 is a die assembly 18 having a lower die set member 19 mounted on the bed 12 and an upper die set member 20 rigidly secured to the underside of the press slide 15 for movement with the slide. The lower die set member 19 supports a die 21 formed with a punch receiving aperture 22 of the desired configuration, and A punch 24 is fixed in depending fashion to the upper die set member 20 for movement into the die aperture 22 upon lowering of the press slide 15 and member 20. To guide lowering and raising movement of the upper die set member 20, a plurality of guide pins 25 extend between the upper and lower die set members. The guide pins 25 in this case are mounted within bushings 26 that permit movement of the upper die set member relative to the pins.

For the purpose of facilitating withdrawal of the punch 24 from the workpiece 11 after a punching operation, a stripper plate 28 is mounted below the upper die set member 20 for relative vertical movement, and a plurality of springs 29 bias the stripper plate 28 in a downward direction. As is known in the art, in the event that the workpiece 11 binds or sticks to the punch 24 during the raising movement following a work stroke, the stripper plate will engage the workpiece and cause it to be forced off the punch.

In operation of the press 10, a blank workpiece 11 is appropriately positioned on the bottom die set member 19 while the press slide 15 is in a raised position. The press slide 15 will then be lowered to cause the punch to engage the workpiece, and further downward movement of the press slide will cause significant compressive forces in the press members. Since certain elements of the press, such as the pitman 16, are particularly vulnerable to damage if subject to excessive loads, it is important to operate the press within its rated capacity. Furthermore, as explained previously, when the workpiece shears the sudden release of resistance causes a snapback that results in a reverse or tension loading in the press pitman; and tension stresses also can occur during stripping of the workpiece from the punch. Although such reverse or tension loads generally are only about 15% of the magnitude of the compressive forces incurred during the working stroke, they nevertheless can cause damage to the press if the design limits are exceeded.

In accordance with the invention, a versatile load sensing device is provided that is adapted to efficiently and economically indicate and monitor the direct loads that are incurred in a load carrying member, as well as to selectively indicate and monitor reverse loads. To this end, a transducer 30 is mounted on the press pitman for sensing both direct and reverse loading in the member and producing an electrical output signal in each case, and means are provided for effectively utilizng such signals in a load detecting and indicating circuit.

The transducer 30, which may be of a type described in applicant's U.S. Pat. No.. 3,612,966, includes a piezoelectric ceramic crystal 32 positioned between a top terminal block 34 and a bottom terminal block 35 with the top and bottom faces of the crystal 32 being in contact with and against the surface of each of the respective terminal blocks. As shown in FIG. 2, the terminal blocks 34, 35 and crystal 32 are surrounded by a metallic sheath 36 which serves as a magnetic and electric shield. The sheath 36 is slightly larger than the terminal blocks and crystal to provide space for a surrounding layer 38 of an encapsulating and insulating plastic material. Leading from the terminal blocks through the insulating layer 38 and the metallic sheath 36 are terminals 39A and 40 with suitable connections for attachment of leads. The terminals 40a, 40b and hence the terminal blocks are electrically insulated from the sheath 36 at the passageway therethrough by the terminal insulators 41. The sheath 36 is grounded to the shield of the shielded cables by suitable connections, not shown.

The transducer 30 is mounted on the pitman 16 so that a line normal to the crystal faces at the interfaces between the crystal 32 and the terminal blocks 34, 35 is parallel to and aligned with the stress to be measured in the member 16 when under load during a working cycle. The transducer 30 is supported between two points in spaced relation to the pitman 16 to provide what may be characterized as a parallel mechanical circuit for shunting a small portion of the stress in the member 16 to the transducer 30. The transducer in this case is clamped between the ends of two brackets 44, 45 that are screwed into the force carrying pitman 16. The ends of the brackets 44, 45 between which the transducer is clamped are provided with ball and socket joints including balls 46 and 48 that engage sockets in the terminal blocks 35 and 34, respectively. The brackets preferably are electrically insulated from the terminal blocks by the balls 46 and 48 which may be made of a refractory insulating material.

In order to permit desired prestressing of the transducer crystal 32, a set screw 49 is provided in the end of the top bracket 45. After the transducer 30 is in position, the set screw 49 is screwed to secure it under a clamping pressure that places the crystal 32 in a prestressed condition. The amount to which the crystal is prestressed must be sufficient so that it is in a stressed condition under all possible conditions of loading during the work cycle of the press. In such condition, during the working cycle of the press, the resulting increases and decreases in stress in the pitman 16 will act upon the transducer through its support bracketry 44, 45 and cause the piezoelectric crystal 32 to produce relatively high voltage output signals proportional to the stress changes. The polarity at the transducer terminals, however, will change according to whether the stress is increasing or decreasing.

Referring to FIG. 3, there is shown a sensing circuit 50 adapted to utilize the transducer output signals that result from either direct or reverse loading on the press pitman. The circuit 50 in this case includes a load limiting circuit 51, which can be employed to operate suitable press stopping means or alarm means when the load exceeds a predetermined value, and an indicating circuit 52 adapted to indicate the magnitude of compressive or tension load in the members. To this end, the output terminals 40a, 40b of the transducer 30 have two pairs of output leads 54a, 54b and 55a, 55b. In FIG. 3, the pair of transducer leads 54a, 54b are shown connected by means of a switch 56 to a pair of leads 58, 59 of an input circuit 60 to a current amplifier 61.

The amplifier 61 consists of a pair of direct-coupled transistors 62, 64 of the NPN variety. In the configuration shown, the transistors form what is commonly called an emitter follower type Darlington pair in that they have their collectors connected together at a point 65 and with the emitter of the first transistor directly attached to the base of the second transistor. The collector connection 65 is tied directly to a positive DC supply terminal 66 while the emitter terminal 68 constitutes the output terminal for the amplifier 61 and is connected to ground through a load resistor 69. A stabilizing resistor 70 having a value at least ten times larger than the load resistor 69 connects the output terminal 68 to the positive supply bus 66. The Darlington transistor arrangement used herein is particularly attractive for this application, since, when properly biased, the effective dynamic input impedance of the amplifier is equal to the product of the beta (current amplification factor) of the first transistor 62, the beta of the second transistor 64, and its load impedance. Typical silicon NPN transistors presently available may have current amplification factors of 100 or more when biased in their linear conduction range. Thus, in cascade, two such transistors will provide an amplification factor of 10,000. The input impedance of the amplifier 42 will be approximately 10,000 times the effective load resistance at the emitter terminal 68 which, for present purposes, will be at least 100 kilohms, making the input impedance to the amplifier 61 at least 1,000 megohms.

To obtain such a high input impedance from the amplifier 61 during static conditions, it is necessary to properly bias the input to render the transistors conductive in their linear range. To this end, the input circuit 60 includes a first voltage 71 connected between ground and positive supply terminal 66. The voltage divider 71 in the present instance is variable through the movement of its wiper arm 72. The divided output voltage present on the wiper arm 72 is applied to the base of the transistor 62 via a diode 74 which is poled to allow bias current flow into the transistor 62. It is desirable to establish a bias voltage on the wiper arm 72 of the voltage divider which will render the transistors 62 and 64 conductive near the lower current end of their linear region of conduction. Assuming the transistors 62, 64 and the diode 74 to be silicon devices, approximately 1.8 volts must be impressed across their three semi-conductor junctions before linear conduction is established. A second voltage divider 75, also in the form of a potentiometer, has a wiper arm 76 for establishing a reference voltage substantially equal to the bias voltage at the base of the first transistor 62 of the amplifier 61. The transducer 30 in this case is part of a branch that includes the transducer 30 itself, a pair of bandpass control resistors 78, 79 in series with the transducer, and a variable conditioning capacitor 80 and directional diode 81 both in parallel with the transducer. With the voltages at the opposite ends of the transducer branch being equal in the static condition of the circuit, zero current will flow through the transducer while it is in its inactive condition.

When an increase in stress occurs in the piezoelectric transducer 30, such as when a compressive force is exerted in the pitman during the working stroke of the press, the piezoelectric crystal 32 produces a voltage across the transducer of a polarity indicated in FIG. 3. This voltage will be proportional to the stress applied, but it will be conditioned or limited by the loading effect of the condensor 80 so that its full-load output is approximately 10 volts. Since the condensor 80 is parallel with the transducer 30, it does not act as an external biasing element so as to reduce the effectiveness of the transducer. As a result, a positive polarity results at the amplifier lead 58, and as the voltage across the transducer rises, the output voltage from the amplifier 61 also rises in a 1:1 ratio. However, the current available to drive the emitter load resistors of the amplifier 61 will be several orders of magnitude greater than the transducer current. The only load impressed upon the transducer, other than that of its conditioning capacitor 80, will be the dynamic impedance of the transistor pair 62, 64 and the reverse impedances of the directional diodes 74 and 81, all of which are in excess of 10 megohms and provide a degree of isolation for the transducer.

In order to limit the stress applied to the force carrying member to a predetermined selected value, the limiting circuit 51 includes an output indicating means including a relay 82 which is adapted to be energized when the current amplified transducer signal exceeds a predetermined threshold value. The relay 82 in this case is selectively controllable by a relay control circuit 84 that includes a control rectifier 85 having anode, cathode and gate terminals 86, 87 and 88, respectively, with the cathode terminal 87 referenced to a variable voltage at the wiper of a potentiometer 89. The potentiometer 89 forms one part of a voltage divider 90 connected between ground and the positive supply terminal 66, which divider also includes a fixed resistor 91, a "coarse" control rheostat 92 and a "fine" control rheostat 94. The gate terminal 88 of the controlled rectifier 85 is connected to the output terminal 68 of the amplifier 61 through an input resistance 95 and a voltage divider consisting of resistors 96 and 98. Several different factors are operative to determine the transducer voltage necessary to trigger the rectifier 85 into conduction for energizing the relay 82. The controlled rectifier 85, typically a silicon device designated as an SCR, is rendered conductive when the voltage at the gate terminal 88 exceeds the reference voltage at the cathode terminal 87 by a fixed amount. Once the rectifier begins conducting, it will remain conducting so long as the current flowing through the anode-cathode junction remains sufficiently high. In the present instance the forward current of the rectifier 85 is limited by the resistance of the lower branch or leg of the potentiometer 89, together with the resistance of the rheostat 94. Preferably, the relay 82 is selected to be energized with the forward current through the silicon controlled rectifier 85 limited to substantially the minimum holding current value necessary to maintain the rectifier 85 in conduction, thereby minimizing power consumption. The threshold voltage at which the rectifier will trigger is established by the reference voltage divider 90 and the gate voltage divider consisting of resistance 96 and 98. The potentiometer 89 is intended to be manually adjustable by way of a hand dial (not shown) which is calibrated to allow the user to easily choose the stress to be detected. It will be appreciated that when the relay 82 is activated the resultant current flow may be utilized to activate suitable monitoring means, such as a control switch for the press which will automatically shut down the press when the set load is exceeded.

To deenergize the relay 82 after it has been activated a re-set switch 99 is connected in series with the relay 82. A diode 100 is connected in parallel with the energization coil of the relay 82 and poled to dissipate the stored charge on the coil of the relay 82 at turn-off and to limit the reverse voltage build-up across the coil. The speed at which the relay deenergizes is further increased by a condenser 101 connected between the anode and the cathode terminals of the rectifier 85. In addition, a re-set button 103 preferably is connected across the input lead 58 and potentiometer arm 76 to enable quick discharge of the capacitor 80.

For the purpose of indicating the load on the press pitman during a working stroke, even though it is not of sufficient magnitude to activate the overload detection relay 82, the indicating circuit 52 is connected to the output of the amplifier 61 at the emitter terminal 68. The indicating circuit 52 includes a current amplifier 105 having its output connected to a suitable meter 106. The amplifier 105 again is a Darlington arrangement of direct coupled transistors 108, 109 having their collectors at a common point 110 and with the emitter of the first transistor attached to the base of the second transistor. The collector connection 110 is tied to the positive DC supply terminal 66 while the emitter terminal 111 constitutes the output terminal for the amplifier 105 and is connected to ground through the resistor 112. Current flowing from the amplifier 61 charges a capacitor 114 connected in a line extending from the input of the transistor 108 to ground for providing a sufficiently prolonged voltage to maintain a current flow through the amplifier 105 and meter 106 to obtain the necessary meter reading. A directional diode 115 in this case is connected in parallel with the capacitor 114. A resistor 116 is provided in a line also extending from the input line for the transistor 108 to prevent shorting of the base of transistor 108 to ground, a diode 118 is included in the input line to prevent reverse current flow from the capacitor 114.

It will be seen that the output signal from the amplifier 105 into the meter 106 again will be proportional to the stress communicated to the transducer 30 from the press pitman. To properly establish or calibrate the maximum and minimum readings of the meter, the output terminal of the meter is connected to a variable resistor 119 which in turn is coupled to the wiper of a potentiometer 120 connected between ground and positive supply terminal 66. A dampening resistor 121 in this case is connected in parallel with the meter 106. Following a work stroke of the press and the resulting load reading in the meter 106, the meter may be quickly returned to zero by depressing a reset button 122 connected in series with the resistor 116 and a diode 124 which has the effect of unloading the capacitor to ground.

From the foregoing, it will be seen that when the circuit 50 is connected to the transducer terminals 40a, 40b in the manner illustrated in solid lines in FIG. 3, during the downward working stroke of the press compressive force incurred in the press pitman will cause a polarity of the transducer terminals, such as shown in the drawing, with the terminal 40a becoming positive. In such case, the transducer output voltage builds up a proportional voltage in the capacitor 80 and there results a current flow from the transducer lead 54a, and through the amplifier lead 58 and amplifier 61, with the directional diode 81 preventing current flow from the amplifier lead 58 to the negative amplifier lead 59. Since the signal generated by the transducer 30 is proportional to the compressive force applied to the pitman and since the overload relay 82 may be set to conduct only when the transducer exceeds a predetermined threshold voltage, the limit circuit 51 is operative to detect when a determined maximum load condition is exceeded. Moreover, the meter 106 of the indicator circuit 52 coupled to the output of the amplifier 61 will indicate the compressive load in the member even though it does not exceed the overload limit.

Upon shearing of the workpiece during the work stroke, the compressive stresses are relieved in the pitman and in fact the resulting snapback action creates a tension force in the member. This change in stress is sensed by the transducer 30 and causes a change of polarity at the transducer terminals 40a, 40b so that, in the illustrated embodiment, the terminal 40b connected to the amplifier input lead 59 becomes positive. In such case, however, the diode 81 acts as a short circuit between the transducer terminals so that no voltage build-up results in the capacitor 80. As a result, no current is supplied to the amplifier 61 and neither the limiter circuit 51 or the indicator circuit 52 will operate to detect or indicate such reverse loading.

In keeping with the invention, means are provided for selectively reversing the connection between the transducer terminals 40a, 40b and the input leads 58, 59 of the sensing circuit so that an output voltage produced from an increase in compressive stress in the transducer is blocked from the amplifying means and an output voltage produced from a decrease in stress or tension of the press load carrying member is applied to the circuit amplifying means. In the illustrated embodiment, the switch 56 is momentary double pole double throw switch that is adapted to selectively disconnect the pair of transducer leads 54a, 54b from the amplifier leads 58, 59 and instead couple the transducer leads 55b, 55a to the amplifier leads 58, 59, respectively. The switch 56 preferably is spring biased to its normally closed position, shown in solid lines in FIG. 3, but may be moved by a lever or the like to reverse the transducer terminal connection, as shown in dotted lines. In such a spring biased switch, when the activating lever is to be released, the switch will automatically return to its original position coupling the leads 54a, 54b with the circuit 50. Alternatively, it will be understood that a push button switch arrangement could be used, or a toggle throw switch wherein the switch remains in the position to which it is moved.

When the switch 56 moved to its reverse load position shown in dotted lines in FIG. 3, it can be seen that during the working stroke of the press when the pitman is compressed, the transducer terminal 40a again would be positive, but in this case, would be connected to the amplifier lead 59. The diode 81, therefore, would short circuit the transducer so that no energy build-up results in the capacitor 80 nor current flow into the amplifier 61.

In such case, at the end of the downward working stroke, the polarity of the transducer terminals 40a, 40b will reverse due to the reduction in stress so that the terminal 40b becomes positive. As the pitman returns to its uncompressed condition, the transducer voltage will cause a voltage build-up in the capacitor 80 and current will be applied to the amplifier from the transducer lead 40b and input lead 59. When the pitman has reached a completely uncompressed condition, the voltage in the capacitor in the usual case is the same as the voltage that results during the work compression stroke. Since the pitman generally goes into tension following breakthrough of the workpiece or during stripping of the workpiece from the punch, the continued reduction in stress in the transducer crystal 32 will produce a still greater voltage in the capacitor 80. As discussed previously, such tension forces, however, generally do not exceed 15% of the direct compressive load and the press elements are accordingly designed. Therefore, if it were desired to limit the tension forces to such level, i.e. 15% of the compressive force rating, in a typical operation with the switch 56 in its reverse load position the limit circuitry 51 would be set so that the relay 82 would not be activated until a signal representing the sum of the usual compression load plus 15% of the rated capacity were applied to the relay. Similarly, the meter 106 would indicate the reverse load in the press pitman at values in excess of the compressive load.

With the switch 56 still connected in its reverse position, during the next compression stroke of an operating cycle, the transducer terminals will again reverse polarity, i.e. terminal 40a becoming positive, causing the capacitor 80 to return to a zero voltage. In the event that an overload is detected reverse load monitoring or if it is desirable to quickly return the meter 106 and capacitors 80, 114 to their zero conditions, the re-set buttons 100, 103, 122, respectively, may be activated, preferably by means of a single switch.

From the foregoing, it can be seen that the load sensing system of the present invention is adapted to limit and indicate the direct loads incurred in the press pitman and to also selectively indicate and limit the reversal or tension loads that the pitman may incur. When the switch 56 is in its normally closed position, shown in solid lines in FIG. 3, the sensing circuit 50 will monitor and indicate the compressive forces incurred in the press pitman during the working stroke press. By merely moving the switch 56 to its reverse load position, shown in dotted lines in the drawings, and running another cycle of the press, the sensing circuit will similarly monitor the reverse or tension loads that are incurred in the load carrying press member. It can be seen that such reverse load determinations may be easily obtained through utilization of the same sensing circuitry and meter that are utilized in monitoring the direct loads.

While in the illustrated embodiment a single tranducer has been shown on the press pitman, it will be understood that more reliable sensing of forces in the load carrying member would be obtained by use of transducers at more than one location. In such case the sum of their output signals could be utilized in the sensing circuitry. Moreover, it will be appreciated that other types of high impedance tranducers might be employed, such as photovaltaic devices and heat activated devices.

I claim as my invention:

1. An improved sensing device for monitoring stresses which are intermittently applied to and removed from a deformable body, comprising, a transducer fixed to said body and having a pair of output terminals, said transducer being adapted to produce electrical output signals upon compressive loading and unloading of said transducer, said output signals being proportional to the change in loading on said transducer and having a polarity during compressive loading that is opposite that during unloading, detector means having a pair of input leads for connection with said transducer output terminals, and switch means for selectively reversing the connection between said input leads and tranducer terminals.

2. The sensing device of claim 1 wherein said transducer output terminals have two pairs of output leads extending therefrom, and said switch means is operable to selectively connect said detector input leads to either of said pairs of output leads.

3. The sensing device of claim 1 in which a directional diode is coupled between said detector input leads.

4. The sensing device of claim 3 in which said detector means includes amplifying means coupled to said input leads for providing an output voltage which is linearly proportional to the voltage of the transducer signal, means coupled to said amplifying means for providing an output indication when said output voltage exceeds a predetermined threshold, and capacitive means coupled across said transducer for charging as stress is applied to said body.

5. An improved sensing device for detecting stresses applied to a deformable body, comprising a transducer including a pair of mounting means fixed to said body substantially in line with the stress to be detected, said transducer having a pair of output terminals and a piezoelectric material interposed between said mounting means for providing at said output terminals a DC signal having a voltage substantially proportional to the stress applied to said body, amplifying means having a pair of input leads, means coupling said transducer terminals to said amplifying means so that a transducer output voltage produced from an increase in stress of said body is applied to said amplifying means and an output voltage produced from a decrease in stress in said body is blocked from said amplifying means, said coupling means being selectively operable to reverse the connection between said transducer terminals and said input leads so that an output voltage produced from an increase in stress in said transducer is blocked from said amplifying means and an output voltage produced from a decrease in stress of said transducer is applied to said amplifying means, said amplifying means providing an output voltage which is linearly proportional to the voltage applied thereto from said transducer signal, and detector means coupled to said amplifying means for providing an output indication in response to the output voltage of said amplifying means.

6. The sensing device of claim 5 in which a directional diode is coupled between said amplifying input leads.

7. The sensing device of claim 6 in which a capacitive means is coupled across said transducer for charging as stress is applied to said body, and said detector means includes a limiting circuit that provides an output indication when said output voltage exceeds a predetermined threshold and an indicating circuit that indicates the proportional level of said amplifying means output voltage.

8. The sensing device of claim 6 in which said detector means includes an output relay, and relay control means coupled to said amplifying means and adapted to energize said relay when said transducer output signal exceeds a predetermined threshold voltage.

9. The sensing device in claim 5 in which said coupling means is a momentary double pull, double pole switch.

* * * * *